United States Patent [19]

Armando

[11] Patent Number: 5,029,549
[45] Date of Patent: Jul. 9, 1991

[54] PROTECTIVE ARTICLE FOR A WINDSHIELD

[76] Inventor: David Armando, 286 Roanoak Ave., Willimantic, Conn. 06226

[21] Appl. No.: 589,217

[22] Filed: Sep. 28, 1990

Related U.S. Application Data

[63] Continuation-in-part of Ser. No. 496,592, Mar. 21, 1990, abandoned.

[51] Int. Cl.⁵ .............................................. B63B 17/00
[52] U.S. Cl. .................................. 114/361; 114/219; 296/84.1
[58] Field of Search ....................... 114/343, 219, 361; 296/84.1, 93; 280/748, 751

[56] References Cited

U.S. PATENT DOCUMENTS

| 4,828,287 | 5/1989 | Siler | 280/751 |
| 4,940,009 | 7/1990 | Keithley, Jr. | 114/361 X |

Primary Examiner—Ed Swinehart
Attorney, Agent, or Firm—Ira S. Dorman

[57] ABSTRACT

A protective article is retrofit upon the upper edge of the windshield of a boat to significantly reduce the risk of injury. The article consists of a longitudinally notched, cylindrical body having a VELCRO ® hook and loop component panel adhered to one of its notch-defining surfaces. A panel of the complementary VELCRO ® hook and loop component is affixed to the windshield frame, so as to secure the article in place with the other notch-defining surface abutted against the inside face of the windshield frame.

13 Claims, 1 Drawing Sheet

PROTECTIVE ARTICLE FOR A WINDSHIELD

CROSS REFERENCE TO RELATED APPLICATION

This application is a continuation-in-part of prior application for U.S. Pat. No. 07/496,592, filed Mar. 21, 1990 and now abandoned.

BACKGROUND OF THE INVENTION

It is common for the windshields of power boats, various land vehicles, and the like, to have hard exposed upper edge portions, which are usually of narrow construction and may have angular features as well. Consequently, such windshields represent a serious hazard to the operator and his passengers, as for example if a collision were to occur or if the boat were to run aground. Although in some instances protective padding and molding pieces have been installed on windshields to minimize the risk of injury, as far as is known no satisfactory product has heretofore been proposed that is adapted for retrofitting so as to provide such protection.

Confer U.S. Pat. No. 3,704,031 provides an impact-absorbing bumper pad on the uppermost portion of a protective frame, the frame being designed for removable mounting on a snowmobile or the like. Heuzonter U.S. Pat. No. 4,151,620 discloses an integral rubber or plastic protective profile member, which is intended to reduce the risk of injury from accidental impact upon the frame of a boat windshield. Johnson U.S. Pat. No. 4,692,969 provides resilient trim for a windshield, and Keithley U.S. Pat. No. 4,694,774 shows a retrofit structure provided to protect tarpaulins for boats and other vehicles.

Accordingly, it is the broad object of the present invention to provide a novel, retrofittable protective article for cushioning the upper edge of a windshield, so as to significantly reduce the risk of injury presented thereby to the operator and passengers of a boat or other vehicle.

It is a more specific object of the invention to provide such an article which is attached to the windshield by use of VELCRO ® (hook-and-loop fastener) components present thereon, and which does not interfere with emplacement of a conventional cockpit cover or with a split window operation.

Another object of the invention is to provide an assembly comprising such a protective article disengagably mounted upon the upper edge of a windshield.

Additional objects of the invention are to provide such an article and assembly having the foregoing features and advantages, which are also of relatively simple and uncomplicated construction, and relatively facile and inexpensive to manufacture and employ.

SUMMARY OF THE INVENTION

It has now been found that certain of the foregoing and related objects of the present invention are attained by the provision of a retrofittable protective article, comprising an elongate cushion component of resiliently yieldable material, which preferably has a uniform, generally circular cross section in planes perpendicular to its longitudinal axis. A notch extends along the entire length of the cushion component, and is defined by intersecting planar surfaces that extend substantial distances inwardly from points angularly spaced from one another, by 90° or more, on the circumference thereof, at least one of the planar surfaces being smooth and adherent. Also extending along substantially the entire length of the cushion component, and adhesively secured to its "one" planar surface adjacent the outer edge thereof, is a panel constituting a component of a hook-and-loop type fastener set. The other of the notch-defining planar surfaces provides a lateral abutment surface that engages the inner face of the windshield frame when the "one" surface is disposed on the adjacent upper face thereof.

In a specific and particularly desirable embodiment of the article, the cushion component will have a nominal diameter of two inches and a nominal length in the range 16 to 60 inches, and the nominal widths of the "one" and the "other" planar surfaces will be one inch and ⅜ inch, respectively. The cushion component will normally be fabricated from a foamed synthetic resinous material, such as a closed-cell polyurethane; the "one" planar surface thereof may be provided by a smooth skin integrally formed over the foamed material, or by a layer of coating material, such as of a vinyl polymer, applied thereto.

Other objects of the invention are attained by the provision of a protected windshield assembly, comprising a windshield having a relatively narrow and hard upper edge portion extending therealong, and a retrofittable protective article having the features hereinabove set forth. In the assembly, the planar surfaces defining the notch of the cushion component are engaged and disposed, with respect to the faces of the frame, as herein described.

DETAILED DESCRIPTION OF THE ILLUSTRATED EMBODIMENT

Figure 2:
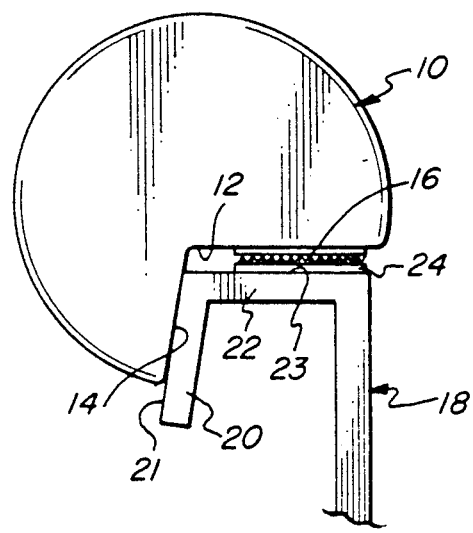
FIG. 2 is a side elevational view showing the article of the invention in assembly with a windshield.
Figure 1:
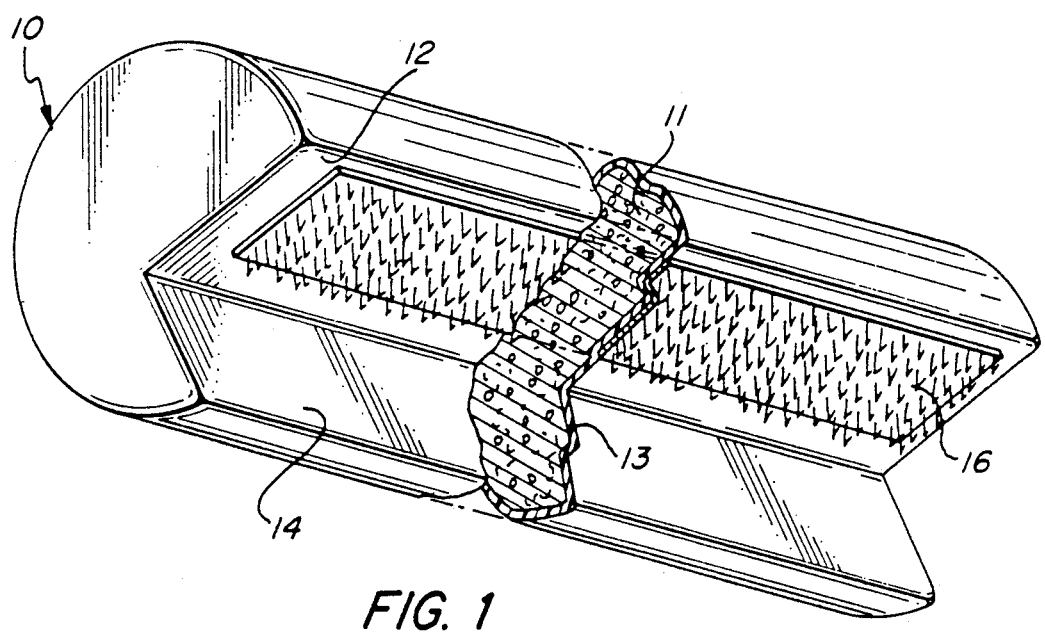
FIG. 1 is a perspective view showing a protective article embodying the present invention.

Turning now in detail to the appended drawing, therein illustrated is a protective article embodying the present invention and in the form of a cushion component, generally designated by the numeral 10. The component 10 consists of a generally cylindrical body 11 of resiliently yieldable foamed material, having a smooth skin 13 thereover and a pronounced longitudinal notch therein, the notch constituting almost one-quarter of the cross-sectional area of the body and being defined by intersecting planar surfaces 12 and 14. A panel 16, constituting the hook-bearing component of a hook-and-loop fastener (i.e., VELCRO ®) set, is bonded to the surface 12.

As shown in FIG. 2, the cushion component 10 is assembled upon the frame 18 of a windshield, the frame including inner and upper elements 20, 22, respectively, each with an outer (normally exposed) face 21, 23. The upper face 23 has affixed to it the complementary loop-bearing component 24 of the VELCRO ® fastener set, with which the component 16 is engaged. Thus, the cushion component is firmly secured on the windshield frame, with the surface 14 abutted against the inside face 21 and with the surface 12 superimposed over the face 23, thereby properly positioning the article to effectively serve its intended function.

It will be noted that the depth of the notch, taken with the cross sectional configuration of the cushion component, is such as to provide thicknesses of material adequate to afford good protection against injury from impact upon the interior and upper surfaces of the frame, as well as upon the sharp corner at the intersection therebetween. At the same time, the dimensions and configurations of the cushion component prevent it from protruding outwardly beyond the leading edge of the frame, as would inhibit placement of a canvas cockpit cover, would cause interference with operation of the split windows of which boat windshields are commonly comprised, and would tend to destabilize the cushioning article and make it more vulnerable to inadvertent disengagement.

As noted above, in a two-inch diameter, generally cylindrical cushion component, the horizontal surface of the notch will desirably be about one-inch wide to accommodate a standard windshield frame. The other surface will advantageously be about ¾ inch wide, so as to provide good cushion thickness on the inside of the cockpit and also to afford secure engagement with the lateral frame surface and thereby secure attachment (in cooperation with the VELCRO ® fastener set). Although some range may exist in the angular relationship between the notch defining surfaces (as to best conform to the edge profile of the windshield frame), normally it will be 90° or slightly greater. Thus, the notch will desirably constitute about one-fifth to one-quarter of the total cross-sectional area of the body. The article will usually be about 16 to 60 inches long, and will normally be furnished in several standard lengths, such a of 18, 30 and 60 inches.

The VELCRO ® elements may be provided either in the form of strips that extend continuously along the lengths of the cushion component and/or of the frame face, or they may be in the form of patches at spaced locations thereon. The element(s) will normally be secured to the cushion component by adhesive bonding, and consequently it is important that the surface be receptive thereto and capable of producing a sound bond. Such a surface may be provided either inherently, as a skin formed during extrusion molding of the foam material, or it may be provided by subsequent coating of the formed piece, e.g., by dipping, spraying or other suitable means. An added coating may also afford aesthetic benefits, such as of coloration and decoration.

Thus, it can be seen that the present invention provides a novel, retrofittable protective article for cushioning the upper edge of a windshield, so as to significantly reduce the risk of injury presented thereby to the operator and passengers of a boat or other vehicle. The article is attached by use of VELCRO ® (hook-and-loop fastener) components present thereon, and does not interfere with emplacement of a conventional cockpit cover or with operation of split windows. The invention also provides an assembly comprising such a protective article so mounted upon the upper edge of a windshield, and both the article and the assembly are of relatively simple and uncomplicated construction, and are relatively facile and inexpensive to manufacture and employ.

Having thus described the invention, what is claimed is:

1. A retrofittable protective article for cushioning the relatively narrow and hard upper edge portion of a windshield having adjacent inner and upper faces, said article comprising an elongate cushion component of resiliently yieldable material having a notch extending along its entire length, said notch being defined by intersecting planar surfaces extending substantial distances inwardly from points angularly spaced by at least 90° from one another on the perimeter of said component, at least one of said planar surfaces being smooth and adherent; and a fastener panel extending substantially along the entire length of said cushion component and adhesively secured to said one planar surface adjacent the outer edge thereof, said panel constituting one component of a hook-and-loop fastener set, the other of said planar surfaces providing a lateral abutment surface for engagement against the inner face of the windshield with said one surface disposed on the adjacent upper face thereof.

2. The article of claim 1 wherein said cushion component has a uniform, generally circular cross section in planes perpendicular to the longitudinal axis thereof.

3. The article of claim 2 wherein said cushion component has a nominal diameter of two inches and a nominal length in the range of 16 to 60 inches, and wherein the nominal widths of said one and said other planar surfaces are one inch and ¾ inch, respectively.

4. The article of claim 1 wherein said cushion component is fabricated from a foamed synthetic resinous material.

5. The article of claim 4 wherein said cushion component has a smooth skin integrally formed thereover providing said one planar surface.

6. The article of claim 4 wherein said cushion has a layer of coating material thereupon providing said one planar surface.

7. A retrofittable protective article for cushioning the relatively narrow and hard upper edge portion of a windshield having adjacent inner and upper faces, said article comprising an elongate cushion component of resiliently yieldable, foamed synthetic resinous material having a uniform, generally circular cross section in planes perpendicular to the longitudinal axis thereof, and having a notch extending along its entire length defined by intersecting planar surfaces extending substantial distances inwardly from points angularly spaced by at least 90° from one another on the circumference of said component, at least one of said planar surfaces being smooth and adherent; and a fastener panel extending substantially along the entire length of said cushion component and adhesively secured to said one planar surface adjacent the outer edge thereof, said panel constituting one component of a hook-and-loop fastener set, the other of said planar surfaces providing a lateral abutment surface for engagement against the inner face of the windshield with said one surface disposed on the adjacent upper face thereof.

8. A protected windshield assembly comprising:
a windshield with a relatively narrow and hard upper edge portion extending therealong and having adjacent inner and upper faces; and
a retrofittable protective article for cushioning said upper edge portion of said windshield, said article comprising an elongate cushion component of resiliently yieldable material having a notch extending along its entire length, said notch being defined by intersecting planar surfaces extending substantial distances inwardly from points angularly spaced by at least 90° from one another on the perimeter of said component, at least one of said planar surfaces being smooth and adherent; and a fastener panel extending substantially along the entire length of said cushion component and adhesively secured to said one planar surface adjacent the outer edge thereof, said panel constituting one component of a hook-and-loop fastener set, the other of said planar surfaces providing a lateral abutment surface for engagement against said inner face of said windshield with said one surface disposed on said adjacent upper face thereof; said windshield also having a fastener panel extending along the length thereof and secured to said upper face, said panel on said windshield constituting the complementary component of a hook-and-loop fastener set, said article being disengagably secured to said windshield with said fastener panels thereof interengaged and with said other surface of said cushion component engaged against said inner face of said windshield.

9. The assembly of claim 8 wherein said cushion component has a uniform, generally circular cross section in planes perpendicular to the longitudinal axis thereof.

10. The assembly of claim 9 wherein said cushion component has a nominal diameter of two inches and a nominal length in the range of 16 to 60 inches, and wherein the nominal widths of said one and said other planar surfaces are one inch and ¾ inch, respectively.

11. The assembly of claim 8 wherein said cushion component is fabricated from a foamed synthetic resinous material.

12. The assembly of claim 11 wherein said cushion component has a smooth skin integrally formed thereover providing said one planar surface.

13. The assembly of claim 11 wherein said cushion has a layer of coating material thereupon providing said one planar surface.

* * * * *